(12) United States Patent
Smith et al.

(10) Patent No.: US 8,419,496 B1
(45) Date of Patent: Apr. 16, 2013

(54) DISPLAY PANEL ALIGNMENT SYSTEM

(75) Inventors: Brian K. Smith, Marion, IA (US); James D. Sampica, Springville, IA (US); Gary N. Prior, Center Point, IA (US); Tracy J. Barnidge, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 359 days.

(21) Appl. No.: 12/726,947

(22) Filed: Mar. 18, 2010

(51) Int. Cl.
*H01J 9/26* (2006.01)
*H01J 9/32* (2006.01)

(52) U.S. Cl.
USPC .............................................. 445/25; 445/43

(58) Field of Classification Search ............ 445/24, 445/25, 66, 70, 73, 43, 44; 349/187
See application file for complete search history.

(56) References Cited

U.S. PATENT DOCUMENTS

| | | | |
|---|---|---|---|
| 5,566,840 A | 10/1996 | Waldner et al. | |
| 5,592,288 A | 1/1997 | Sampica et al. | |
| 6,388,724 B1 | 5/2002 | Campbell et al. | |
| 6,614,057 B2 | 9/2003 | Silvernail et al. | |
| 6,803,245 B2 | 10/2004 | Auch et al. | |
| 6,984,545 B2 | 1/2006 | Grigg et al. | |
| 6,998,648 B2 | 2/2006 | Silvernail | |
| 7,273,403 B2 | 9/2007 | Yokota et al. | |
| 7,381,110 B1 | 6/2008 | Sampica et al. | |
| 7,435,311 B1 | 10/2008 | Marzen et al. | |
| 7,452,258 B1 | 11/2008 | Marzen et al. | |
| 7,566,254 B2 | 7/2009 | Sampica et al. | |
| 8,038,498 B2 * | 10/2011 | Miyauchi et al. | 445/25 |
| 2001/0053648 A1 * | 12/2001 | Furukawa et al. | 445/24 |
| 2002/0167629 A1 * | 11/2002 | Blanchard | 349/112 |
| 2003/0189606 A1 * | 10/2003 | Moon et al. | 347/2 |
| 2005/0126679 A1 | 6/2005 | Kim | |
| 2006/0245171 A1 | 11/2006 | Kim | |
| 2009/0120572 A1 | 5/2009 | Sampica et al. | |

(Continued)

FOREIGN PATENT DOCUMENTS

| | | | |
|---|---|---|---|
| EP | 0556351 B1 | 8/1993 |
| EP | 0711103 B1 | 5/1996 |

(Continued)

OTHER PUBLICATIONS

Office Action for U.S. Appl. No. 12/009,373, mail date Dec. 30, 2009, 14 pages.

(Continued)

*Primary Examiner* — Mariceli Santiago
*Assistant Examiner* — Glenn Zimmerman
(74) *Attorney, Agent, or Firm* — Donna P. Suchy; Daniel M. Barbieri (57) ABSTRACT

Attaching a first display panel and a second display panel can utilize a method that aligns the first display panel and the second display panel. The method provides the first display panel on a first stage and the second display panel on a second stage. The position of the second display panel is adjustable relative to the first display panel in at least two dimensions. The method can also include disposing the first display panel above the second display panel, aligning the first display panel with respect to the second display panel using an optical device, and adhering the first display panel to the second display panel. The method can be utilized including an apparatus comprising two stages and an optical or sensing system.

20 Claims, 7 Drawing Sheets

U.S. PATENT DOCUMENTS

| | | |
|---|---|---|
| 2009/0120585 A1 | 5/2009 | Sampica et al. |
| 2009/0126872 A1 | 5/2009 | Sampica et al. |
| 2009/0183381 A1 | 7/2009 | Sampica et al. |
| 2009/0183615 A1 | 7/2009 | Sampica et al. |
| 2009/0186218 A1 | 7/2009 | Sampica et al. |

FOREIGN PATENT DOCUMENTS

| | | |
|---|---|---|
| JP | 1-210328 A | 8/1989 |
| JP | 5-200880 A | 8/1993 |
| JP | 5-293895 A | 11/1993 |
| JP | 6-051484 A | 2/1994 |
| JP | 9-057779 A | 3/1997 |
| JP | 10-156853 A | 6/1998 |
| JP | 10-244589 A | 9/1998 |
| JP | 2000-141388 A | 5/2000 |
| JP | 2004-233590 A | 8/2004 |
| JP | 2006-218658 A | 8/2006 |
| JP | 2006-334912 A | 12/2006 |
| JP | 2007-206559 A | 8/2007 |
| JP | 2008-238607 A | 10/2008 |
| WO | WO 93 05634 | 3/1993 |

OTHER PUBLICATIONS

Walker, G., GD-Itronix Dynavue Technology, The Ultimate Outdoor-Readable Touch-Screen Display, *Rugged PC Review*, Jun. 4, 2007, 4 pages.

\* cited by examiner

DISPLAY PANEL ALIGNMENT SYSTEM

CROSS-REFERENCE TO RELATED PATENT APPLICATIONS

The present application is related to U.S. application Ser. No. 12/009,375, filed Jan. 18, 2008; U.S. application Ser. No. 12/009,472, filed Jan. 18, 2008; U.S. application Ser. No. 12/009,373, filed Jan. 18, 2008; U.S. application Ser. No. 12/009,393, filed Jan. 18, 2008; U.S. application Ser. No. 12/009,372, filed Jan. 18, 2008; and U.S. application Ser. No. 12/009,482, filed Jan. 18, 2008, all of which are incorporated by reference herein in their entireties.

BACKGROUND OF THE INVENTION

Display screens and other monitors are used to provide images. Certain types of three dimensional displays (also known as 3-D displays and stereoscopic displays) require two display panels. The display panels can be liquid crystal display (LCD) panels, organic light emitting diode (OLED) panels, or other types of display panels.

The display panels are generally laminated together with liquid adhesives or held together in a metal or plastic frame with an air gap between the panels. Relative positional control between the LCD panels is limited to the accuracy of the scribe and break accuracy of the two panels. Inaccuracy in placing the panels with respect to each other can produce a ghosting or other degradation of the 3-D image and otherwise adversely affect image quality.

Inaccuracy in placing the panels with respect to each other may also affect the maximum luminance of the 3-D image. A typical RGB pixel includes red, green, and blue elements arranged next to each other. Misaligned panels may have, for instance, red elements on one panel that partially or completely overlay blue or green elements on the other panel. Alternatively, misaligned panels may cause a pixel element to be partially obscured by structure (e.g., pixel border) associated with the other panel.

Thus, there is a need for a system and method for aligning display panels such as liquid crystal display panels (i.e., LCD panels). Further, there is a need for accurately positioned and laminated LCD panels for creating realistic three dimensional images. Further still, there is a need for a method of aligning display panels at a better accuracy (e.g., better than 0.05 millimeters for a 10.4 inch VGA panel with a 640×480 resolution and a pixel pitch of 330 microns×330 microns). Yet further, there is a need for a method and apparatus for ensuring that LCD panels are not misaligned to the point of unacceptable luminance or picture degradation (e.g., more than 0.2 millimeters for striped pixel elements). Further, there is a need for a system for aligning display panels with striped pixel elements.

SUMMARY OF THE INVENTION

An exemplary embodiment relates to a method of attaching a first display element and a second display element. The method includes providing the first display panel on a first stage and providing a second display element on a second stage. A position of the second display element is adjustable relative to the first display element in at least two dimensions. The method also includes disposing the first display element above the second display element, aligning the first display element with respect to the second display element using at least one optical device, and adhering the first display element to the second display element.

Another exemplary embodiment relates to an apparatus for aligning a first display panel and a second display panel. The apparatus includes a first stage for supporting the first display panel, a second stage for supporting the second display panel, and a system for viewing or sensing alignment of the first display panel and the second display panel. The second display panel is adjustable relative to the first display panel in at least two dimensions. The second stage includes a loading position and aligning position. The display panel is disposed above the second display panel in the aligning position.

Another exemplary embodiment relates to a lamination system. The system includes a first means for supporting a first display panel and a second means for supporting a second display panel. The system includes an optical means for viewing or sensing the first fiducial and the second fiducial. The first display panel includes at least one first fiducial and the second display panel includes at least one second fiducial. The first display panel is adjustable relative to the first display panel in at least two dimensions. The second means is capable of a loading position and an aligning position. In the aligning position, the first display panel is disposed above the second display panel and is moveable relative to each other to align at least one first fiducial and at least one second fiducial of the first display panel and the second display panel.

BRIEF DESCRIPTION OF THE DRAWINGS

The numerous advantages of the subject matter of the present disclosure may be better understood by those skilled in the art by reference to the accompanying figures wherein like numerals denote like elements.

DETAILED DESCRIPTION OF EXEMPLARY EMBODIMENTS

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring now to FIGS. 1-7, an alignment system 10 according to one exemplary embodiment can be executed to align a display panel or element 44 and a display panel or element 46. Alignment system 10 may comprise a vacuum chamber 50. Use of vacuum chamber 50 can shorten the process. Alternatively, system 10 can be provided without a vacuum chamber 50 and may be provided in a chamber or an area at normal atmospheric pressure. Final lamination of elements 44 and 46 with vacuum may be done with a process as described in U.S. Pat. No. 5,592,288, incorporated herein by reference.

Figure 1:
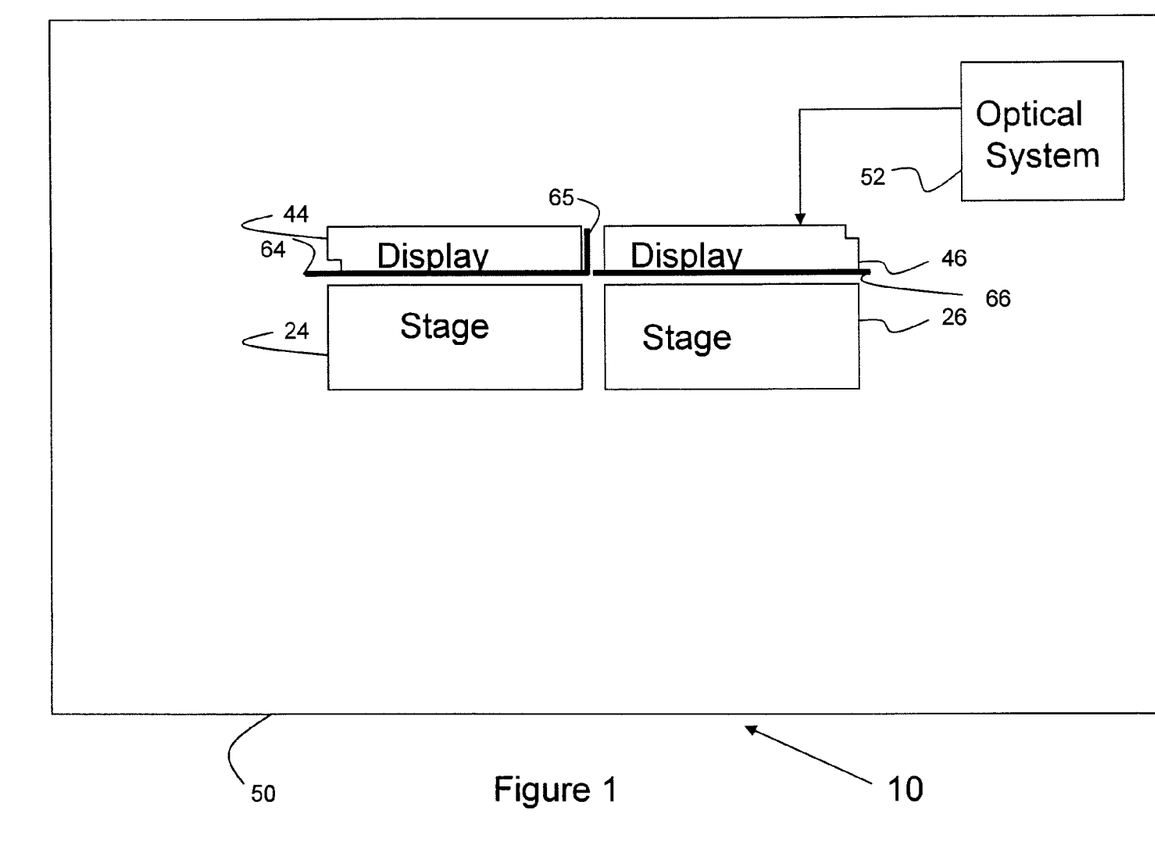
FIG. 1 is general schematic block diagram of an alignment system in a load position according to an exemplary embodiment.
Figure 2:
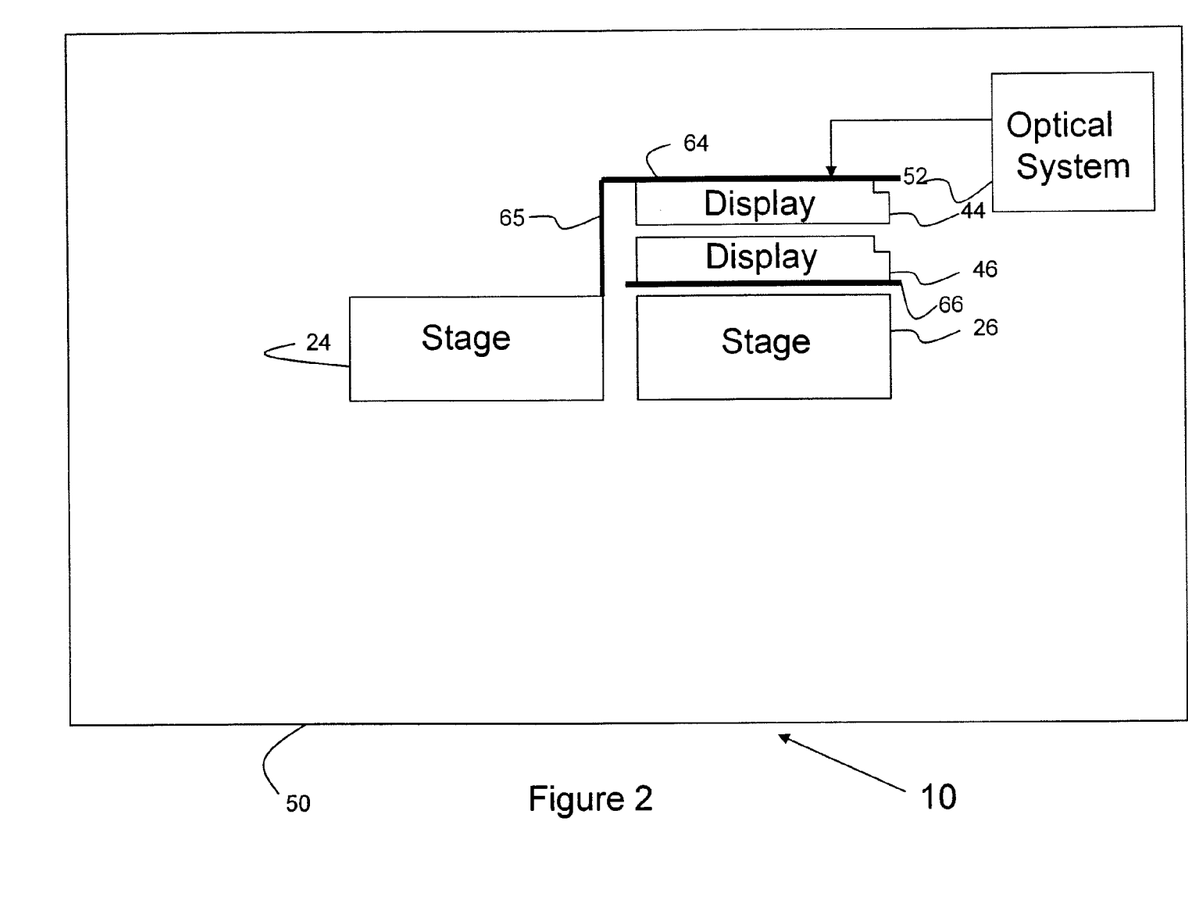
FIG. 2 is a schematic general block diagram of an alignment system in an alignment position according to another exemplary embodiment.

Vacuum chamber 50 may be any container which is capable of being sealed so as to separate a space interior to the vacuum chamber 50 from a space exterior to the vacuum chamber 50. For example, the vacuum chamber 50 may be a generally rectangular structure having a vacuum chamber body and a vacuum chamber lid. Vacuum chamber 50 may be constructed of any number of materials having sufficient strength so as to maintain a vacuum such as aluminum, steel, carbon fiber, plastics, and the like. The vacuum level in vacuum chamber 50 may be determined such that chamber 50 has sufficient holding power without disturbing the display cell gap.

System 10 preferably includes a stage 24, a stage 26 and an optical system 52. Preferably, stages 24 and 26 are disposed side by side with respect to each other. Stages 24 and 26 can be model 271 lab jack type stages manufactured by Newport. According to other exemplary embodiments, stages 24 and 26 may be motorized and automated.

In one embodiment, display element 44 is provided on a surface or panel 64 associated with stage 24. Display element 46 is provided on a surface or panel 66 associated with stage 26. Panels 64 and 66 support display elements 44 and 46. Panel 66 can be similar to panel 64. Panel 64 and panel 66 can be provided of any material, such as plastic. Preferably, panel 64 and panel 66 are translucent. In one embodiment, panel 64 and panel 66 can have an orange translucent color, can be clear or can have another translucent color.

Alternatively, in other embodiments, panel 64 and panel 66 may be another rigid material, such as a polymer or metal. Panels 64 and 66 are preferably formed from an anti-static material or are provided with an anti-static coating to prevent electro-static damage to sensitive electrical devices and components (e.g., LCDs, etc.). If panels 64 and 66 are not formed from a translucent material, fiducial viewing openings can be provided in panels 64 and 66, such as with a machining process.

Figure 5:
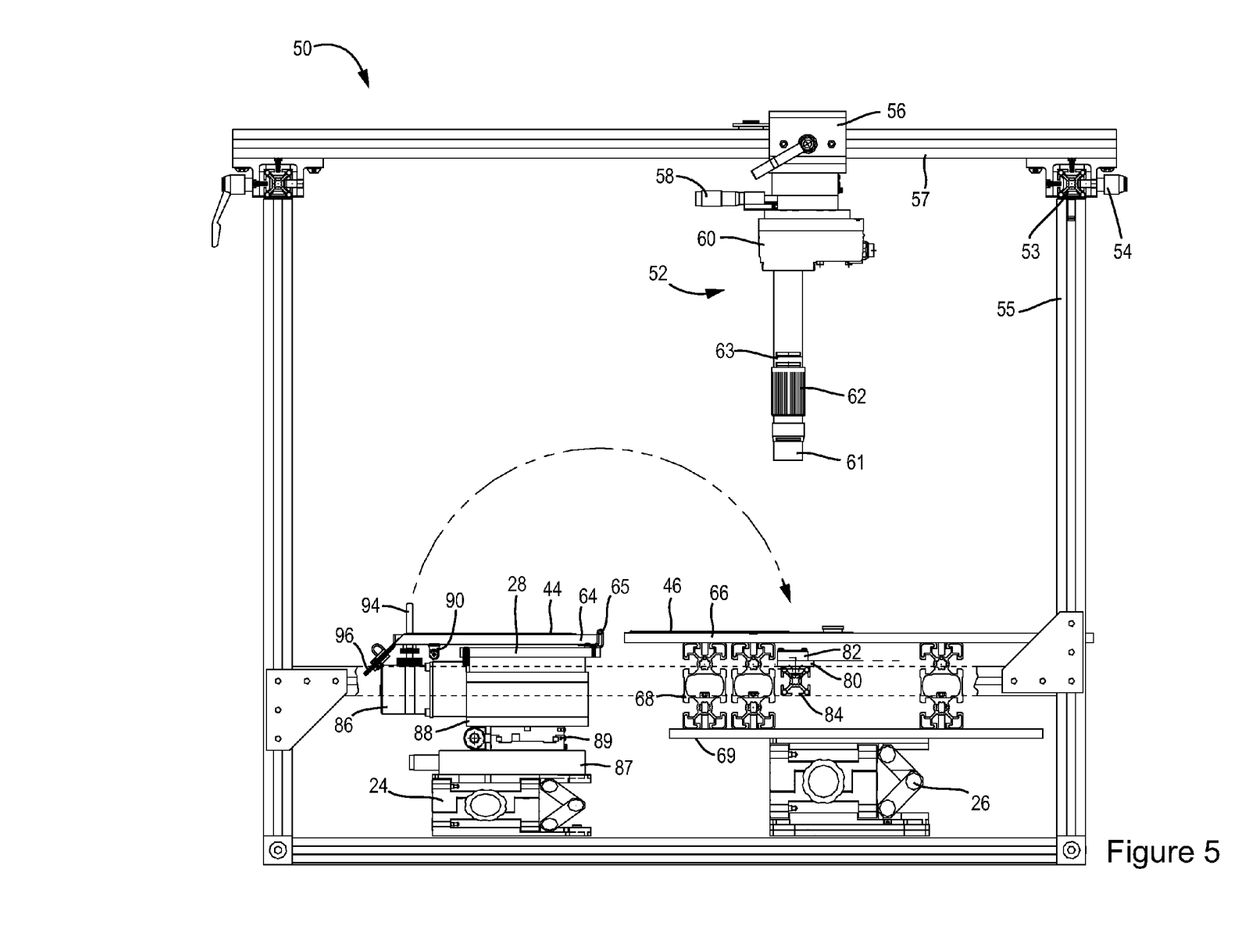
FIG. 5 is a more detailed schematic perspective view of the alignment system illustrated in FIG. 1 in the load position according to another exemplary embodiment.

As shown in FIGS. 1 and 5, system 10 and display element 44 are in a load position in which display element 44 is placed on display element 46 and rough adjustments are made to the alignment of display element 44 (and panel 64) with respect to display element 46 (and panel 66). Three or more indexing pins can be used for coarse alignment of display element 44 and display element 46, with display element 44 being oriented face down and display element 46 being oriented face up.

Figure 6:
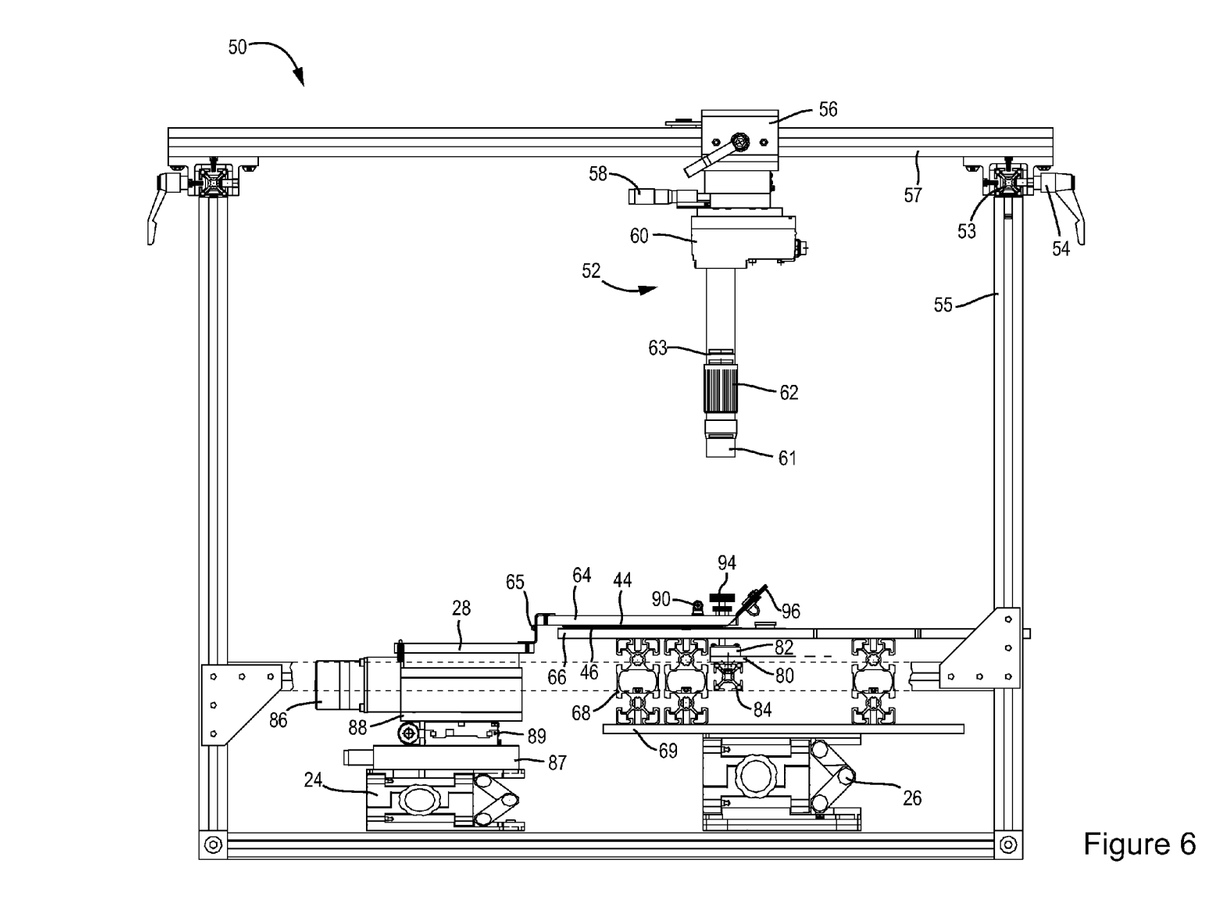
FIG. 6 is more detailed schematic perspective view of the alignment system illustrated in FIG. 1 in the alignment position according to another exemplary embodiment.

As shown in FIGS. 2 and 6, system 10 is in an alignment position in which display 44 is provided above display element 46. System 10 can utilize a hinge 65 to effect operation from the load position to the alignment position. Hinge 65 couples panel 64 to a table or surface 28 that is supported by stage 24. Alternatively, other coupling methods and mechanisms between panel 64 and stage 24 can be used to effect transition between the load position and the alignment position.

Display elements 44 and 46 can be LCD display panels, OLED panels, or other displays, assemblies, or devices for use in display systems. In one embodiment, elements 44 and 46 are LCD panels utilized in three dimensional displays requiring high accuracy placement. Display elements 44 and 46 are preferably planar, rectangular panels. Other shapes for elements 44 and 46 are possible.

Display element 44 is preferably held against surface 64 via a vacuum connection 90. Once in the alignment position, stage 24 is utilized to adjust the position of display element 44 and stage 26 can be utilized to adjust the position of display element 46 to provide accurate positioning of element 44 with respect to element 46. Alternatively, only one stage is required to be moved such that one of elements 44 and 46 is adjusted with respect to the other of elements 44 and 46. Typically, stage 26 is set and not moved until final contact is desired. Stage 24 and screw 94 are used to move display element 44 close to display 46 (e.g., less than 0.03 inches) and parallel to display 46. Adjustments to the X, Y, and theta positions of stage 24 are made to align display element 44 over display element 46. Display element 46 may then be lifted to make contact with display element 44, as lowering display element 44 to make contact with display element 46 would change the angle of orientation of display element 44 such that it was no longer parallel with display element 46. Relative positions of display element 44 and display element 46 may be monitored using optical system 52 while display element 46 is being lifted into place.

An adjustment screw 94 or other similar device is coupled to surface 64. Once display 44 is moved into an alignment position, adjustment screw 64 may be used to further set the position of display 44 parallel relative to display 46. Adjustment screw 94 may be turned such that the end of the screw 94 advances from or is withdrawn closer to surface 64 and contacts a rigid component such as a magnet rail 80. The position of adjustment screw 94 (e.g., the distance of the top of screw 94 relative to surface 64) may be set by turning screw 94 to align display 44 parallel to display 46.

System 10 may further include a rotary stage 86 to position display 44 relative to display 46. Rotary stage 86 is coupled to stage 24 with a rotary adapter plate 88. Rotary stage 86 may be a Parker Hannifin 30005P stage or another suitable manual or automated stage.

Optical system 52 is preferably configured to provide a user an indication of the position of displays 44 and display 46. Optical system 52 can include cameras, scopes, or other devices for determining the position of display elements 44 and 46. According to one embodiment, optical system 52 includes a camera 60, an objective lens 61, a video microscope lens 62, and an iris lens 63. Optical system 52 allows fiducials or individual pixel elements to be viewed or sensed. In an alternative embodiment, optical system 52 is a microscope, a viewer or the other components that sense the alignment of elements 44 and 46.

Optical system 52 may be coupled to stages 24 and 26 for providing an automatic adjustment. Alternatively, an automatic adjustment circuit or manual adjustment can be utilized to adjust the position of display elements 44 and 46 on stages 24 and 26, respectively. As shown in FIGS. 5 and 6, in one embodiment, the position of the optical system 52 is controlled with a coarse y-axis adjustment device 54, a coarse x-axis adjustment device 56, and a fine x-axis and y-axis adjustment device 58. Y-axis adjustment device 54 moves along a horizontal rail 53 that is supported by vertical rails 55. X-adjustment device 56 moves along a horizontal rail 57.

Alternatively, optical system 52 can be a location system that relies on mechanical or electronic components to sense a position of elements 44 and 46 on stages 24 and 26. According to one exemplary embodiment, a light sensor may be used to sense the luminance through display elements 44 and 46 that are backlit (e.g., by a backlight coupled to magnet rail 80). The light sensor may be oriented similar to optical system 52, perpendicular to display elements 44 and 46. By making fine adjustments to the relative positions of display elements 44 and 46, the pixels of display panels 44 and 46 may be aligned (e.g., aligning the red elements of the pixels of display panel 44 with those of panel 46, the green elements of display element 44 with those of panel 46, and the blue elements of display element 44 with those of 46). As panels 44 and 46 become more aligned, more light reaches the light sensor. When a maximum amount of light is sensed by the light sensor, maximum alignment is achieved. In this way, monitoring the output of the light source with the sensor can be used to determine when alignment is achieved. The light can be a monochrome light, white light, laser light, etc. In one embodiment, a red, green, or blue light is utilized to ensure that only light from one color pixel element is received by the light sensor. In another embodiment, red, green, and blue light is provided successively.

Stages 24 and 26 are preferably adjustable in a number of dimensions. In one preferred embodiment, stages 24 and 26 are each adjustable in the Z axis, the X axis, the Y axis. In addition, in a preferred embodiment stages 24 and 26 can also be adjusted for tilt about the X and Y axis and for rotations above the Z axis. System 10 may further include an additional stage 87 for making adjustments along the x-axis and an additional stage 89 for making adjustments along the y-axis.

Panel 66 is supported by one or more spacer rails 68 arranged on a platform 69 that is coupled to stage 26. Spacer rails 68 can be more rigidly supported by platform 69 than if they were supported directly by stage 26. The positions of spacer rails 68 on platform 69 may be adjusted to improve weight distribution and to make coarse adjustments of display element 46 along the x-axis and the y-axis.

Figure 3:
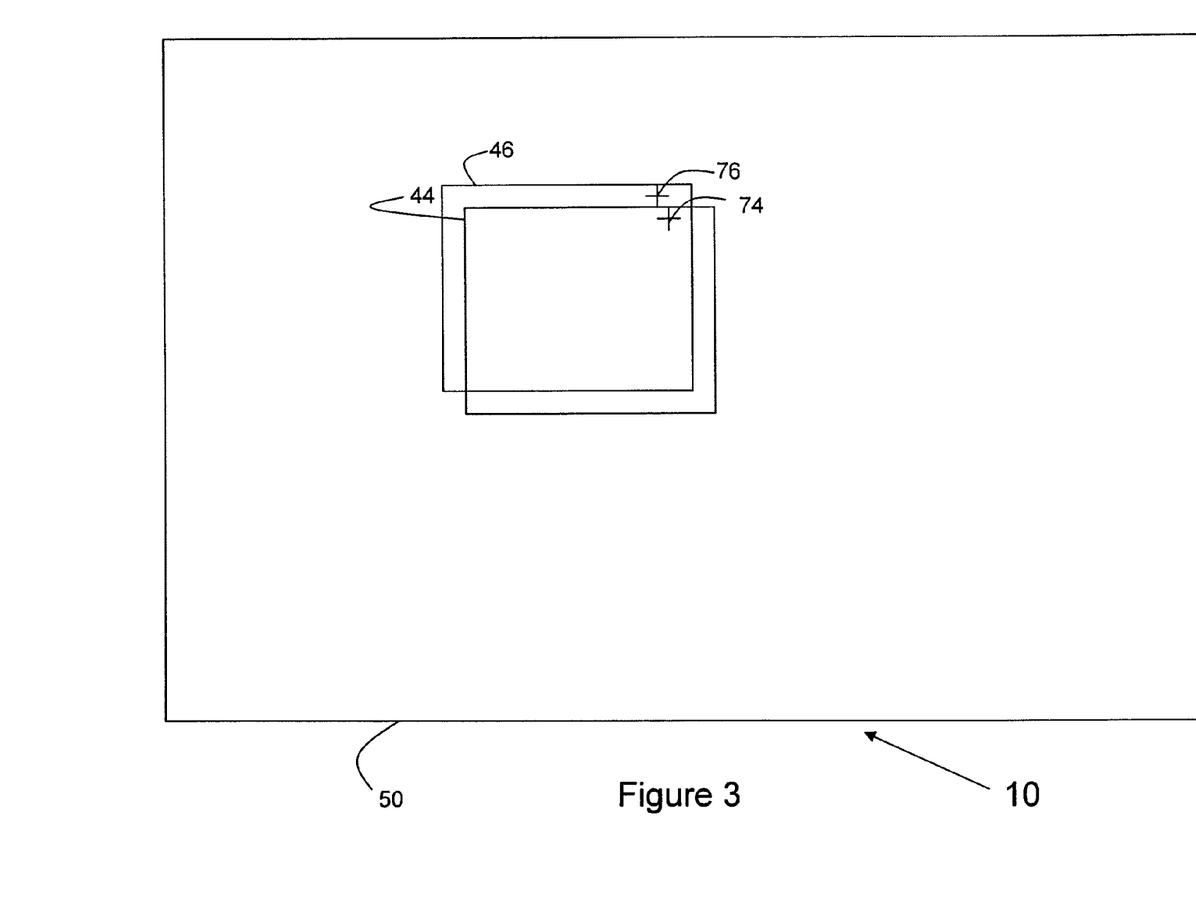
FIG. 3 is a general block diagram of fiducials on display elements illustrated in FIG. 1. system according to an exemplary embodiment.

With reference to FIG. 3, display element 44 includes at least one fiducial mark 74 and display element 46 includes at least one fiducial mark 76. Fiducial marks can be any shape and can be fiducial marks associated with the manufacture of elements 44 and 46 (e.g., type fiducial marks). In such an embodiment, additional alignment markings are not required to be placed on elements 44 and 46. Although crosses are shown as fiducial marks 74 and 76, any shape is possible, including circular, square, oval, combinations thereof, etc. Fiducial marks 74 and 76 may be positive features (e.g., a colored or shaded mark on a clear background) or negative features (e.g., a clear mark on a colored or shaded background).

Fiducial marks 74 are 76 are visible to optical system 52 through transparent surfaces 64 and 66 or through openings in surfaces 64 and 66. Optical system 52 is utilized to ensure that fiducial marks 74 and 76 are placed above each other to ensure proper alignment. For example, fiducial marks 74 and 76 should be aligned to be directly over each other and that offset is not noticed as shown in FIG. 3. The adjustment can be made automatically utilizing positioning software and a computer for adjusting the position of stages 24 and 26. The computer, via execution of software, can adjust the position of stage 24 and stage 26 until marks 74 and 76 are directly above each other. Image processing software can be utilized to determine if marks 74 and 76 are offset from each other and make appropriate adjustments until marks 74 and 76 are aligned. Alternatively, an operator can view the position of fiducial marks 74 and 76 through optical system 52 and manually adjust the position of at least one of stages 24 and 26 to position displays 44 and 46 accurately above each other. In a manual system, an operator may use, for example, a monitor displaying images from a camera or a direct view microscope. As described above, a light source and a light sensor may be used to precisely align display elements 44 and 46 by measuring the luminance through the display elements 44 and 46.

In a preferred embodiment, optical system 52 includes at least 2 cameras positioned perpendicular to elements 44 and 46. The image of each element 44 and 46 from each camera in optical system 52 is displayed side by side so that corrections can be made with respect to the position of displays 44 and 46 using stages 24 and 26.

Preferably, each of elements 44 and 46 includes at least one of fiducial mark 74 and 76, respectively. Preferably, fiducial marks are provided at different places on elements 44 and 46 (e.g., on opposite or diagonally opposed corners) to ensure proper alignment. Fiducial marks 74 and 76 can be etched, printed, stained, cut, molded, stamped, or otherwise marked upon elements 44 and 46.

An LED backlight or other light source may be positioned under at least fiducial marks 74 and 76. A backlight increases the visibility of fiducial marks 74 and 76 and increases the ease with which display elements 44 and 46 may be aligned. According to an exemplary embodiment, the backlight includes a magnet LED holder 82. Magnetic LED holder 82 is coupled to a magnet rail 80 that is supported by a magnet rail support 84. Magnetic LED holder 82 may be repositioned on magnet rail 80 to provide backlight at various places behind display elements 44 and 46. Further, magnet LED holder 82, magnet rail 80, and magnet rail support 84 provide a heat sink for the backlight.

An LCD board support 96 may be provided to support the LCD driver board and position it so that it does not obscure the line of sight between optical system 52 and fiducial marks 74 and 76.

Figure 4A:
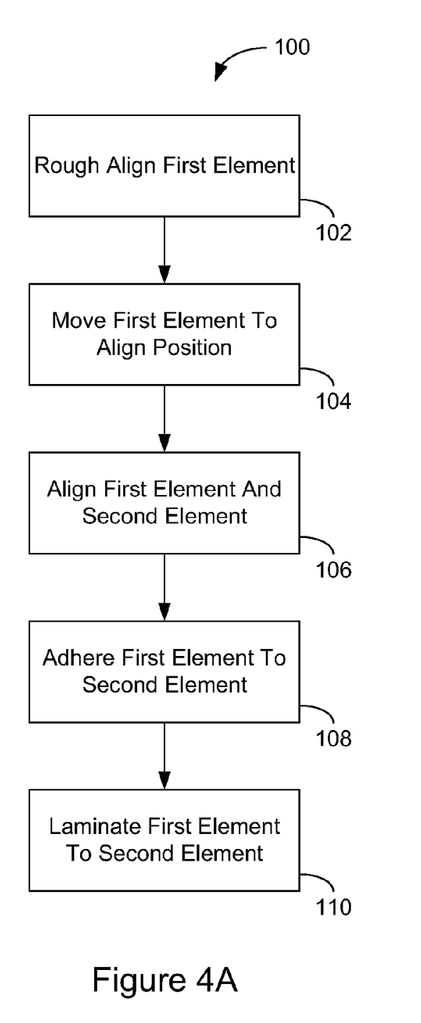
FIG. 4A is a block diagram of a process of aligning the display elements as illustrated in FIG. 1.

With reference to FIG. 4A, a process 100 allows elements 44 and 46 to be aligned accurately to reduce image degradation and increase luminance in 3-D displays. In a step 102, display element 44 on stage 24 is roughly aligned with respect to display element 46 on stage 26 in the load position. Display element 46 may also be roughly adjusted using stage 26 and positioning spacer rails 68. Process 100 can utilize system 10 (FIGS. 1-6). At a step 104, display element 44 is disposed above display element 46. In a step 106, display element 44 is aligned above display element 46. Preferably, elements are aligned such that errors are less than 0.20 millimeters in any axis. In a most preferred embodiment, accuracy of better than 0.05 millimeters is achieved. In a step 108, element 44 is adhered (e.g., tack adhered) to element 46. Alignment can be achieved by first coarse aligning panels 64 and 66 using manual adjustment and optical/mechanical tools. After coarse alignment, finer alignments can be achieved using manual or automated processes. Alternatively, the entire alignment operation can be automated using electronic sensors and controls. In a step 110, elements 44 and 46 are laminated together. In one exemplary embodiment, dry film vacuum lamination may be used. According to other exemplary embodiments, any other suitable technique can be used to attach or adhere element 44 to element 46.

Preferably, a small parallel gap is provided in step 104 such that fiducial alignment marks 74 and 76 are both in focus at the same time of optical system 52. Alternatively, fiducial alignment marks 74 and 76 are not utilized and select pixel elements on each of display elements 44 and 46 are utilized. In such an embodiment, a small parallel gap between elements 44 and 46 is relatively small or minimized and controlled closely such that the pixel elements of each display are both in focus at the same time. Preferably, at least two cameras are positioned perpendicular to elements 44 and 46 thereby allowing elements 44 and 46 to be positioned accurately and stable enough to view fiducial marks 74 and 76 and/or the pixel elements. The alignment marks 74 and 76 or pixel elements can be viewed on a microscope, monitor, screen or other display. The pixel elements can be monochrome or color elements.

Preferably, the clear pressure sensitive adhesive is provided above display element 46 in the load position. Once displays 44 and 46 are positioned with respect to each other using optical system 52, elements 44 and 46 can be temporarily held together with an optically clear pressure sensitive adhesive placed on the top surface of 46 until vacuum laminated by a process such as the process described in U.S. Pat. No. 5,592,288. Elements 44 and 46 are temporarily held together by closing the gap between elements 44 and 46 until the adhesive is engaged. Preferably, alignment accuracy of better than 0.05 millimeters is obtained for a 10.4 inch VGA panel with 640×480 resolution and a pixel pitch 330×330 microns. In another preferred embodiment, alignment accuracy of better than 0.2 millimeters for a panel with striped pixel elements is achieved.

Figure 4B:
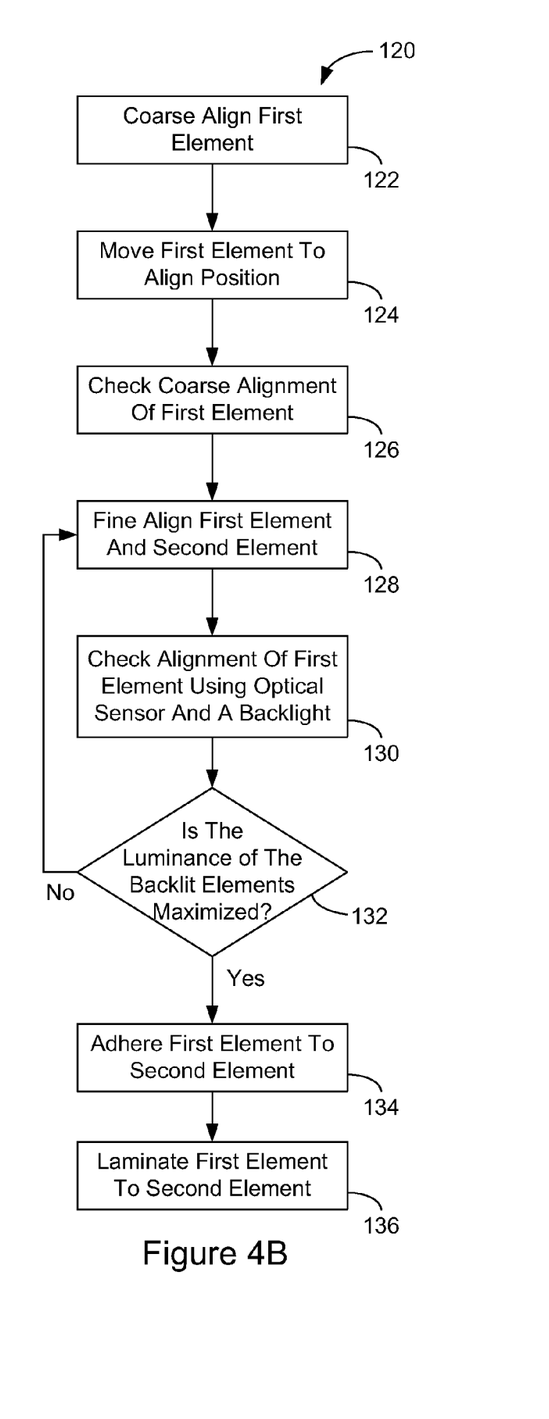
FIG. 4B is a block diagram of a process of aligning the display elements as illustrated in FIG. 1 according to another exemplary embodiment.

With reference to FIG. 4B, a process 120 allows elements 44 and 46 to be aligned accurately with the use of an optical sensor to reduce image degradation and increase luminance in 3-D displays. Process 120 may be performed with system 10. In a step 122, display element 44 on stage 24 is roughly aligned with respect to display element 46 on stage 26 in the load position. Display element 46 may also be roughly adjusted using stage 26 and positioning spacer rails 68. At a step 124, display element 44 is disposed above display element 46. In a step 126, the alignment of display element 44 above display element 46 is checked such as by unaided visual inspection.

In a step 128, display element 44 is finely aligned with respect to display element 46. Preferably, at least one optical sensor (e.g., light sensor) is positioned perpendicular to elements 44 and 46 opposite of a light source (e.g., backlight) provided on the opposite side of elements 44 and 46. The optical sensor is used to sense the luminance through backlit display elements 44 and 46. By making fine adjustments to the relative positions of display elements 44 and 46, the pixels of display panels 44 and 46 may be aligned (e.g., aligning the red elements of the pixels of display panel 44 with those of panel 46, the green elements of display element 44 with those of panel 46, and the blue elements of display element 44 with those of 46). In a step 130, the luminance of the light passing though displays 44 and 46 are checked by sensing the luminance. In a step 132, the luminance sensed in step 130 is checked against a previous value and the position of display element 44 is fine adjusted more until the pixel elements are aligned and the luminance is maximized.

In a step 134, display element 44 is adhered to display element 46. Preferably, a clear pressure sensitive adhesive is provided above display element 46 in the load position. Once displays 44 and 46 are positioned with respect to each other using optical system 52, elements 44 and 46 can be temporarily held together with an optically clear pressure sensitive adhesive placed on the top surface of 46 until vacuum laminated by a process such as the process described in U.S. Pat. No. 5,592,288. Elements 44 and 46 are temporarily held together by closing the gap between elements 44 and 46 until the adhesive is engaged.

Although shown as aligning in vacuum chamber 50, the alignment operation can occur outside of the vacuum chamber and elements 44 and 46 can be transported to a vacuum tray table for vacuum lamination. At a step 136, elements 44 and 46 are laminated together. In a preferred embodiment, dry film vacuum lamination is utilized, although any other suitable technique can be utilized to attach or adhere element 44 to element 46.

Figure 7:
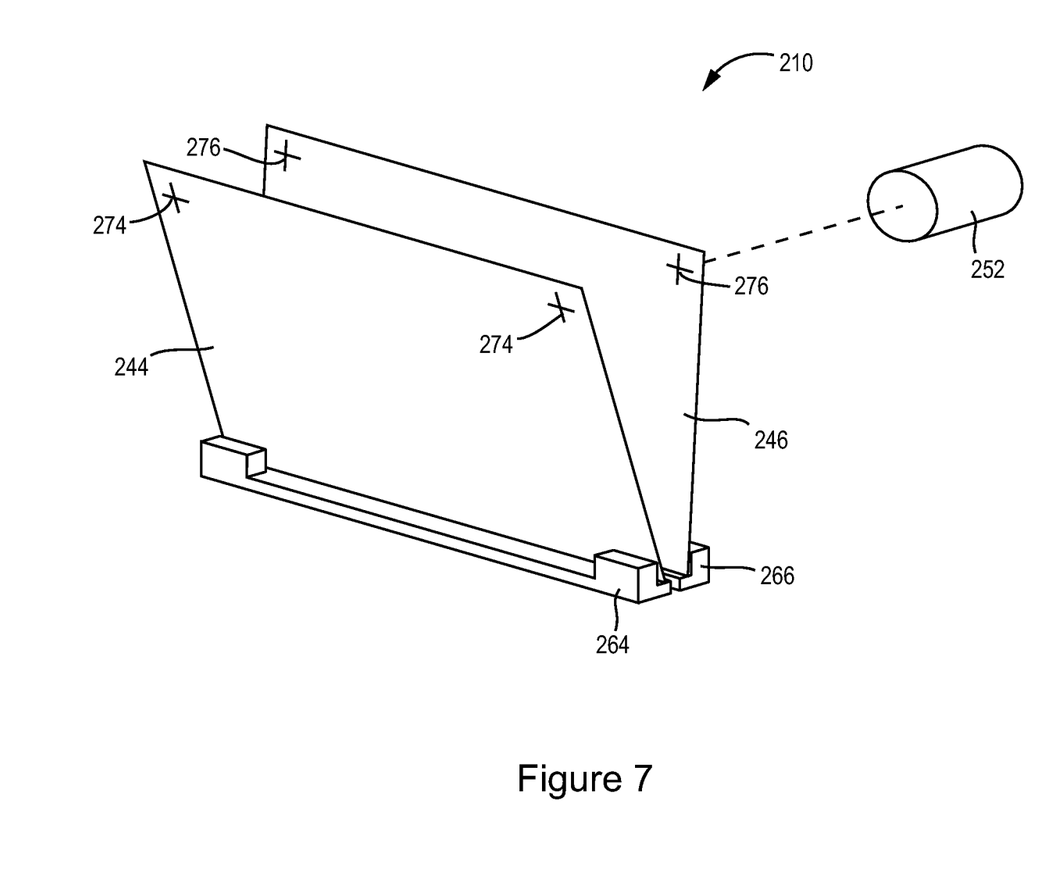
FIG. 7 is an isometric view of an alignment system according to another exemplary embodiment in which the display elements are in a generally vertical orientation.

Referring now to FIG. 7, according to another exemplary embodiment, an alignment system 210 may be rotated so first display panel or element 244 and the second display panel or element 246 are on edge rather than horizontal. Process 100 can be performed with system 210. Such system of supporting the display panels on edge is described in more detail in U.S. patent application Ser. No. 12/009,373 incorporated hereby by reference. System 210 includes a first display element 244 and a second display element 246. Display elements 244 and 246 are supported by vertical supports 264 and 266. Supports 264 and 266 hold displays 244 and 246 in a generally vertical orientation at a small angle relative to each other. Supports 264 and 266 may be coupled to stages such as those shown in FIGS. 5 and 6 that are configured to allow an operator to control the positions of support 264 (and display 244) and support 266 (and display 246). At least one fiducial mark 274 is provided on display element 244 and at least one fiducial mark 276 is provided on display element 246.

Like optical system 52 described above, an optical system 252 is configured to provide a user an indication of the positions of display elements 244 and 246 or can be part of an automated system for aligning display elements 244 and 246. Optical system 52 is oriented generally horizontally, to the side of display elements 244 and 246 to view display 244 and 246 simultaneously in order to, for example, align corresponding fiducial marks 274 and 276 or align pixel elements, as described above. Alternatively, alignment can be achieved using the luminance alignment process discussed above.

Elements 244 and 246 and elements 44 and 46 may be placed and/or aligned using computing systems, environments, and/or configurations that may be suitable for utilization with location software and/or hardware, such as personal computers, server computers, hand-held or laptop devices, multimethodor systems, micromethodor-based systems, set top boxes, programmable consumer electronics, network PCs, minicomputers, mainframe computers, distributed computing environments that include any of the above systems or devices, and the like. This list is not restrictive. It is contemplated that any suitable computing systems, environments, and/or configurations may be utilized without departing from the scope and intent of the disclosure. Course and fine positioning may utilize edge lengths of elements 44 and 46 or 244 and 246 to determine the proper alignment position or various calculated/sensed datum. The multiple datum allow a tooling system to determine the correct vertical and horizontal alignment position for the planar items. A location determiner can provide instruction to a tooling system for forming a tooling aid and/or tooling aids to properly align the planar items in a planar substrate lamination apparatus for lamination. The tooling system utilizes the instructions to form the tooling aids and/or insert the tooling aids into the planar substrate lamination apparatus.

Systems and apparatuses in accordance with various embodiments disclosed herein provide a system and method for aligning display elements 44 and 46 and display elements 244 and 246, (e.g., LCD display panels). In this regard, the various embodiments may be described herein in terms of functional block components and various methoding steps. It should be appreciated that such functional blocks may be realized by any number of hardware, firmware, and/or software components configured to perform the specified functions. For example, certain embodiments may employ various integrated circuit components, e.g., memory elements, digital signal methoding elements, look-up tables, and the like, which may carry out a variety of functions under the control of one or more micromethodors or other control devices. Such general techniques and components that are known to those skilled in the art are not described in detail herein. Furthermore, although the subject matter of the present disclosure is frequently described herein as pertaining to displays composed of one or more substrates, it will be appreciated that the systems and methods described herein could also be applied to any elements adhered with any adhesive including, but not limited to, a pressure sensitive adhesive.

The methods disclosed may be implemented as sets of instructions, through a single production device, and/or through multiple production devices. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the disclosure. The accompanying method claims present elements of the various steps in a sample order, and are not necessarily meant to be limited to the specific order or hierarchy presented.

Various embodiments include one or more techniques described below relating to separating laminated substrates. Each of these techniques may be implemented using standard user interface techniques, such as standard graphical software programming or the like. Of course any programming language or environment could be used to implement the techniques described herein. Furthermore, the foregoing described embodiments may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is believed that the subject matter disclosed herein and many of its attendant advantages will be understood by the foregoing description, and it will be apparent that various changes may be made in the form, construction, and arrangement of the components thereof without departing from the scope and spirit of this disclosure or without sacrificing all of its material advantages. The form herein before described being merely an explanatory embodiment thereof, it is the intention of the following claims to encompass and include such changes.

It is to be understood that the subject matter disclosed herein may be conveniently implemented in forms of a software package. Such a software package may be a computer program product which employs a computer-readable storage medium including stored computer code which is used to program a computer to perform the disclosed function and method of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

What is claimed is:

1. A method of attaching a first display panel element and a second display panel element, the method comprising:
providing the first display panel element on a first stage;
providing the second display panel element on a second stage, a position of the second display panel element being adjustable relative to the first display panel element in at least two dimensions;
disposing the first display panel element above the second display panel element;
aligning the first display panel element with respect to the second display panel element using at least one optical device;
adhering the first display panel element to the second display panel element, wherein the first and second stages are adjustable in a Z-axis, and in tilt and rotation; and
wherein the first stage includes a first planar member for the first display panel element and a second member, the first planar member being attached to the second member via a hinge, the first display panel element being disposed above the second display panel element by operation of the hinge.

2. A method of attaching a first display panel element and a second display panel element, the method comprising:
providing the first display panel element on a first stage;
providing the second display panel element on a second stage, a position of the second display panel element being adjustable relative to the first display panel element in at least two dimensions;
disposing the first display panel element above the second display panel element;
aligning the first display panel element with respect to the second display panel element using at least one optical device; and
adhering the first display panel element to the second display panel element, wherein the first and second stages are adjustable in a Z-axis, and in tilt and rotation.

3. The method of claim 2, wherein the adhering step includes disposing a pressure-sensitive adhesive layer between the first display panel element and the second display panel element.

4. The method of claim 3, wherein the adhering step includes laminating in a vacuum chamber.

5. A method of attaching a first display panel element and a second display panel element, the method comprising:
providing the first display panel element on a first stage;
providing the second display panel element on a second stage, a position of the second display panel element being adjustable relative to the first display panel element in at least two dimensions;
disposing the first display panel element above the second display panel element;
aligning the first display panel element with respect to the second display panel element using at least one optical device; and
adhering the first display panel element to the second display panel element wherein the first stage includes a first planar member for the first display panel element and a second member, the first planar member being attached to the second member via a hinge, the first display panel element being disposed above the second display panel element by operation of the hinge.

6. The method of claim 5, wherein the first stage and the second stage are disposed side-by side.

7. The method of claim 5, wherein the first planar member includes a vacuum fitting for holding the first display panel element.

8. The method of claim 2, wherein the aligning step uses at least one first fiducial disposed on the first display panel element and at least one second fiducial disposed on the second display panel element.

9. The method of claim 2, wherein the aligning step uses at least one pixel element disposed on the first display panel element and at least one pixel element disposed on the second display panel element.

10. The method of claim 8, wherein the first display panel element and the second display panel element are held with a small parallel gap between the first display panel element and the second display panel element, and the at least one first fiducial and the at least one second fiducial are aligned together before the adhering step.

11. The method of claim 10, wherein the first display panel element and the second display panel element are held together with an optically clear plastic adhesive before being vacuum laminated.

12. A method of attaching a first display panel and a second display panel, the method comprising:
   supporting the first display panel on a first stage;
   supporting the second display panel on a second stage;
   adjusting the second display panel relative to the first display panel in at least two dimensions, wherein the second stage being capable of a loading position and an aligning position, wherein in the aligning position, the first display panel is disposed above the second display panel;
   viewing or sensing alignment of the first display panel to the second display panel in the aligning position; and
   adhering the first display panel to the second display panel, wherein the second stage includes a hinge and the aligning position is achieved by rotating with respect to the hinge.

13. The method of claim 12, wherein an optical system includes two cameras for viewing at least two fiducials on the first and second display panels and is used in the viewing or sensing step.

14. The method of claim 2, wherein the second stage includes a hinge and an aligning position is achieved by rotating with respect to the hinge.

15. The method of claim 12, wherein an optical system senses the aligning position by sensing the amount of light received from a source disposed on a side opposite a sensor of the optical system.

16. A method of attaching a first display panel and a second display panel in a substrate lamination system, the method comprising:
   supporting a first display panel on a first stage;
   supporting a second display panel on a second stage, wherein the second display panel includes a first fiducial and the second display panel includes a second fiducial;
   adjusting the first display panel relative to the first display panel in at least two dimensions, wherein the first display panel is disposed above the second display panel, wherein the second stage includes a hinge and the first display panel is disposed above the second display panel by use of the hinge;
   viewing or sensing the first and second fiducial; and
   adhering the first display panel and the second display panel together.

17. The method of claim 16, wherein the viewing or sensing step uses an optical system includes at least one camera and a display screen.

18. The method of claim 16, wherein the adjusting is in three dimensions.

19. The method of claim 16, wherein a clear pressure adhesive is disposed between the first display panel and the second display panel in the adhering step.

20. The method of claim 16, wherein the first display panel and the second display panel are disposed with a small parallel gap in an alignment position such that the first and second fiducials are simultaneously in a focus of an optical system used in the viewing or sensing step.

* * * * *